May 28, 1957  E. W. LARSEN  2,793,419
DEVICE FOR WINDING CONDUCTORS AROUND TERMINALS
Filed Feb. 5, 1954  3 Sheets-Sheet 1
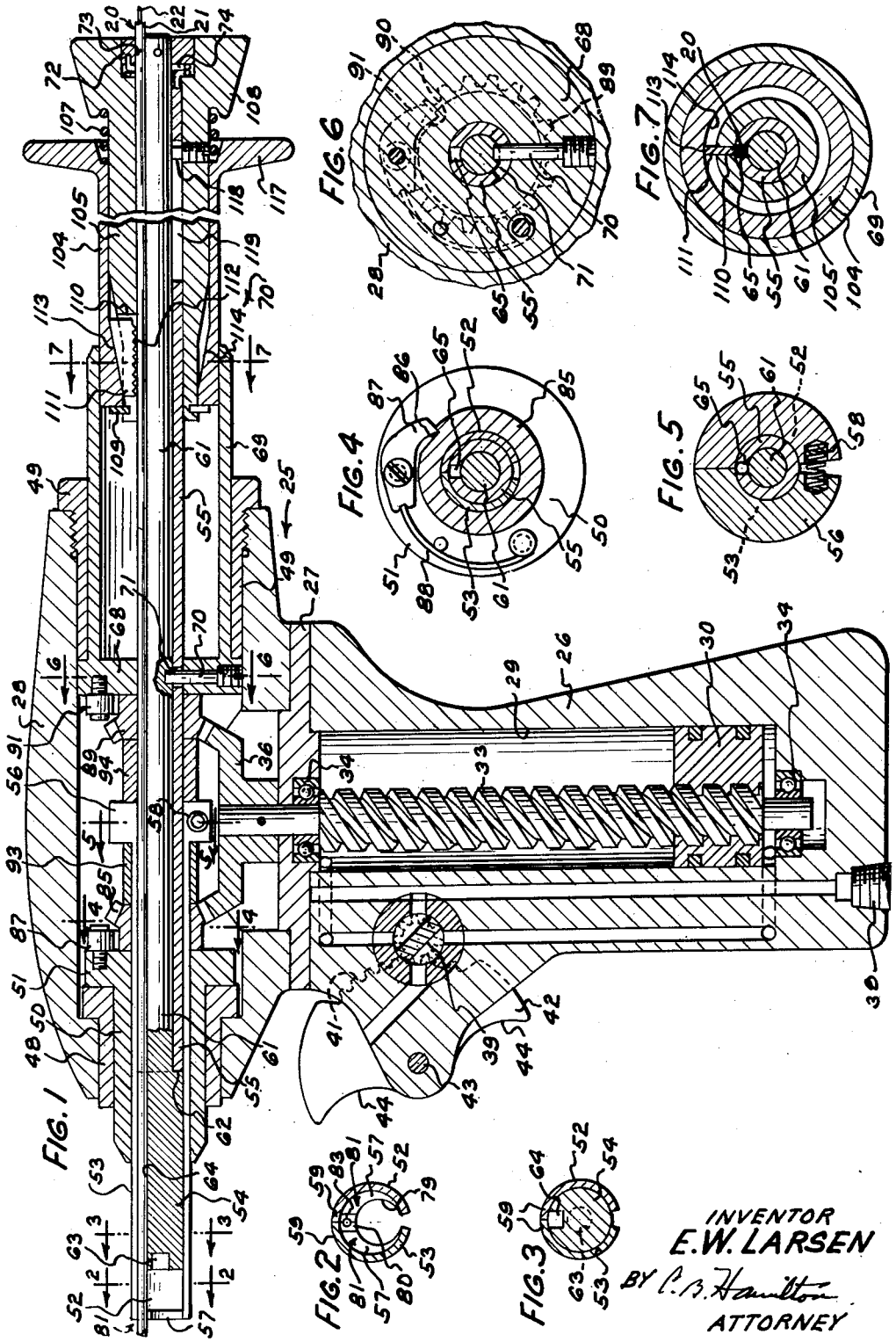
INVENTOR
E. W. LARSEN
BY
ATTORNEY

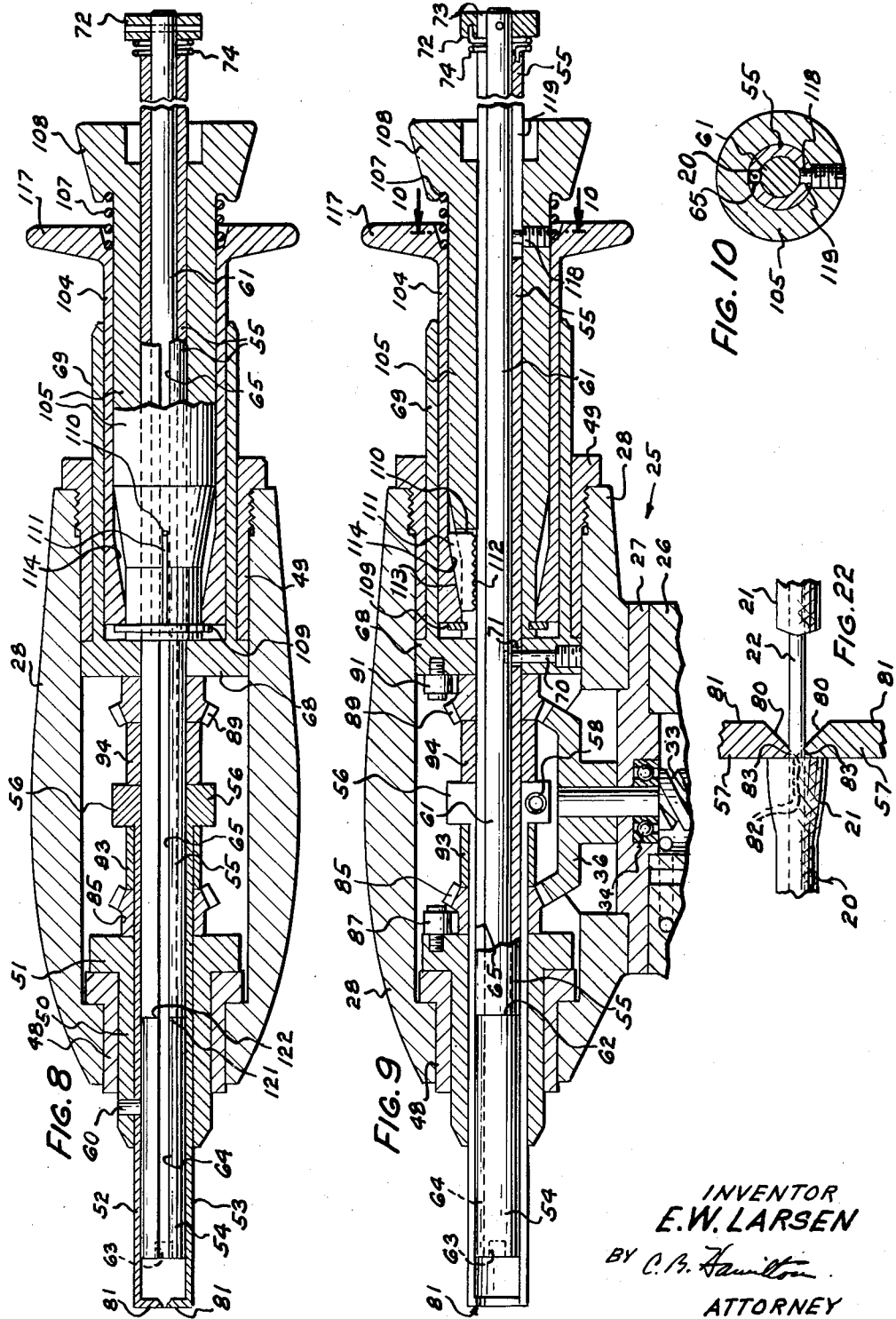

May 28, 1957 — E. W. LARSEN — 2,793,419
DEVICE FOR WINDING CONDUCTORS AROUND TERMINALS
Filed Feb. 5, 1954 — 3 Sheets-Sheet 3
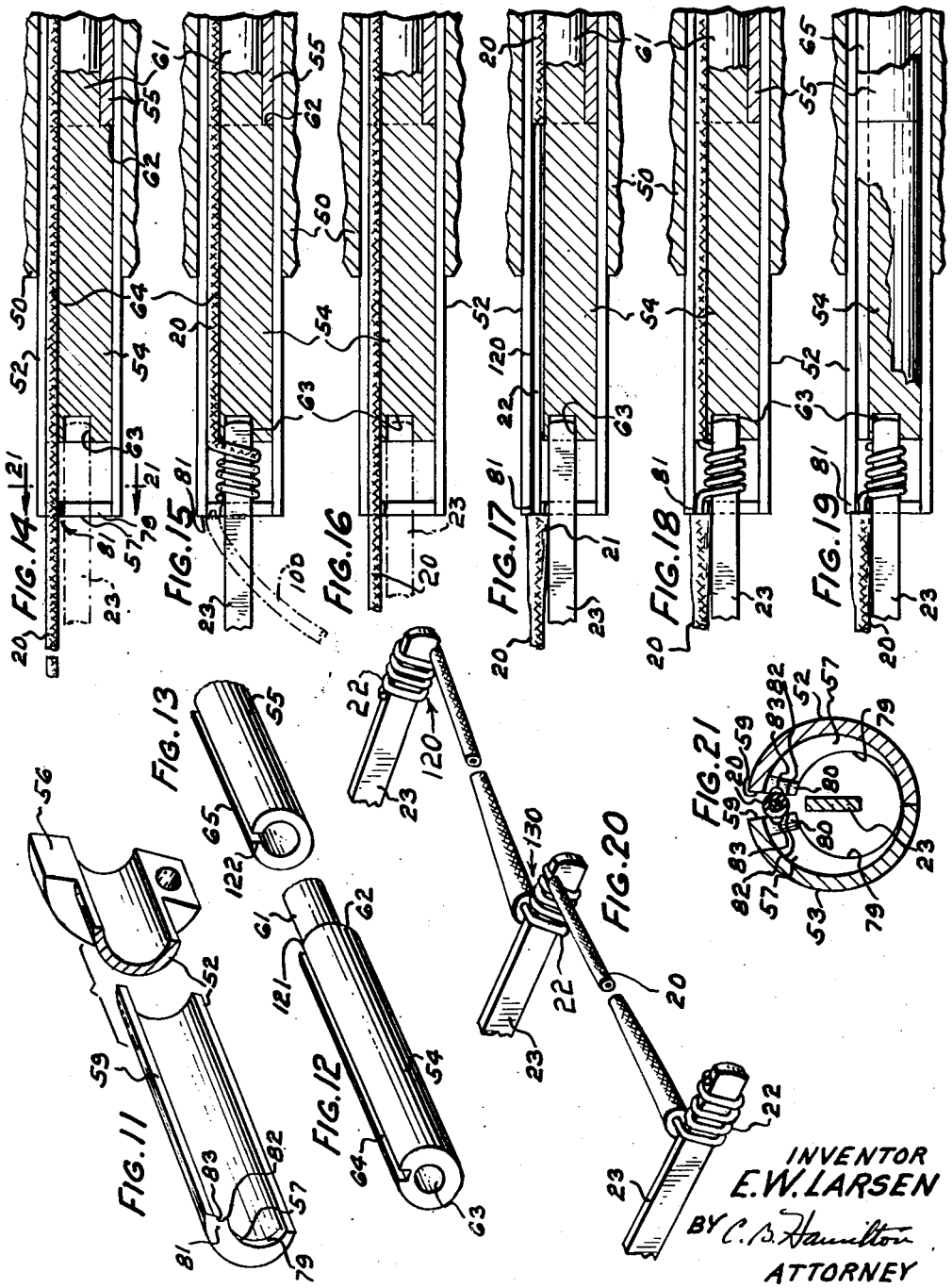
INVENTOR
E. W. LARSEN
BY C. B. Hamilton
ATTORNEY

United States Patent Office 2,793,419
Patented May 28, 1957

2,793,419

DEVICE FOR WINDING CONDUCTORS AROUND TERMINALS

Einer W. Larsen, Elmhurst, Ill., assignor to Western Electric Company, Incorporated, New York, N. Y., a corporation of New York Application February 5, 1954, Serial No. 408,333

19 Claims. (Cl. 29—33)

This invention relates to a device for electrically insulated conductors to terminals and more particularly to a hand tool for skinning the sheath of insulation from portions of wire core of insulated conductors and winding the wire core around terminals.

It is an object of the invention to provide an improved hand tool for winding conductors around terminals.

It is a further object of the invention to provide a hand tool for skinning a portion of a sheath of insulation from the wire core of an insulated conductor and winding the wire core onto a terminal.

Another object of the invention is to provide a novel device for stripping portions of insulation from a wire core of an insulated conductor at spaced intervals and winding the bare wire portions of the conductor onto a plurality of terminals to electrically interconnect them.

One type of wire skinning and winding device illustrating certain features of the invention for electrically connecting an insulated conductor to a terminal or a plurality of terminals may include a housing, a spindle mounted in the housing for rotation about its axis and having a recess at one end thereof for supporting a terminal about which the bared wire core portion of the conductor is to be wound and having means forming a passageway for longitudinally guiding the conductor through the housing in radially spaced relation to the axis of the spindle and for rotating said conductor about said axis, a pair of winding and stripping jaws yieldably urged for movement towards each other and mounted in axially spaced relation to the end of said spindle and in radially spaced relation to the axis thereof for yieldably engaging a portion of the conductor disposed in said passageway and between the jaws, and means for selectively rotating either the spindle or the jaws whereby a conductor may be disposed in the passageway in said device with the leading end thereof extending a predetermined distance beyond the jaws, and the device may then be applied to one of a set of terminals and the jaws rotated through a predetermined number of revolutions to cause them to sever a portion of the sheath of insulation on the wire core of the conductor and strip the sheath as they wind the bared portion of the core around the terminal. The device may then be removed from the first terminal a predetermined distance, causing a desired length of the conductor to be drawn through the device and a mechanism in the device for retracting the conductor a predetermined distance is actuated to cause the jaws to strip or longitudinally displace the sheath of insulation from a second portion of the wire core during the retraction of the conductor, after which the device may be applied to a second terminal and the spindle rotated through a predetermined number of revolutions while the jaws remain stationary to cause the bared portion of the wire core to be wound around the second terminal. In like manner, the device may be operated to skin and wind successive spaced apart bared portions of the conductor core onto successive terminals and the device is provided with a cut-off mechanism so that after the last portion of the conductor core has been bared preparatory to winding it onto the last terminal of the set, the cut-off mechanism may be actuated to sever the conductor from the supply and the bared portion of the conductor core then wound onto the last terminal of the set.

Other objects and advantages of the invention will become apparent by reference to the following detailed description and the accompanying drawings illustrating a preferred embodiment thereof, in which Fig. 1 is a longitudinal vertical sectional view through the device showing the conductor retracting mechanism in its retracted position;

Figs. 2–7 are detailed sectional views of the device shown on an enlarged scale and taken on the lines 2—2 to 7—7, respectively, of Fig. 1;

Fig. 8 is a plan sectional view through the device showing the conductor retracting mechanism in its forward position;

Fig. 9 is a vertical longitudinal sectional view of a portion of the device showing the conductor retracting mechanism in its forward position;

Fig. 10 is a detailed cross-sectional view taken on the line 10—10 of Fig. 9;

Figs. 11, 12, and 13 are fragmentary perspective views of parts of the mechanism of the device;

Fig. 14 is a longitudinal vertical sectional view of a portion of the device showing a conductor positioned in the device preparatory to actuating the device and applying the conductor onto the first one of a set of terminals;

Fig. 15 is a view similar to Fig. 14 showing the conductor applied to the first terminal;

Fig. 16 is a view similar to Fig. 14 showing the device and the conductor preparatory to the application of the conductor to a second one of the set of terminals;

Fig. 17 is a view similar to Fig. 16 showing the conductor after it has been retracted and a portion of the sheath thereof has been displaced from the wire core of the conductor preparatory to winding the core onto the terminal;

Fig. 18 is a view similar to Fig. 17 showing the conductor after it has been wound onto the second terminal;

Fig. 19 is a view similar to Fig. 18 showing the conductor after it has been severed from a supply and has been wound onto the last one of the set of terminals;

Fig. 20 is a perspective view of a set of three terminals interconnected by a conductor wound thereon with the present device;

Fig. 21 is a detailed cross-sectional view taken on the line 21—21 of Fig. 14; and Fig. 22 is an enlarged horizontal sectional view showing the winding and stripping jaws displacing a portion of the sheath of insulation from the core of the conductor.

The present wire winding device is in the form of a pneumatically actuated hand tool (Fig. 1) having a passageway for guiding an insulated conductor 20 through the tool and having mechanism to skin portions of the sheath of insulation 21 from the single wire or core 22 of the conductor to wind the wire 22 around terminals 23 (Fig. 20) and to sever from the supply of the conductor, the portion thereof connected to the terminals. With this type of tool it is possible to skin a portion of a conductor and wind it onto a terminal, then, without severing the conductor, move the tool over to another terminal and skin and wind another portion of the conductor thereon, and repeat this performance as many times as desired to electrically interconnect a plurality of terminals of electrical apparatus, such as telephone switching equipment.

The device has a housing 25 comprising a pistol grip type of handle 26, a plate 27, and a barrel 28 suitably secured together by screws (not shown). A cylinder 29, formed in the handle 26, has a piston 30 reciprocable therein, which has an eccentric threaded bore for receiving a screw shaft 33, the opposite ends of which are journalled in bearings 34 mounted in the handle 26 and the plate 27 in eccentric relation to the axis of the cylinder 29. The eccentric position of the screw shaft 33 within the cylinder prevents rotation of the piston during the reciprocation thereof. A bevelled gear 36 is fixed to the screw shaft 33 and is rotated in opposite directions through a predetermined angular distance in response to the reciprocation of the piston 30 within the cylinder 29. Compressed air from an air line 38 is directed selectively to opposite ends of the cylinder 29 through suitable passageways under control of a rotary valve 39, which has gear teeth formed thereon meshing with a gear segment 41 formed on a substantially semi-circular disc-like trigger or lever 42. The trigger 42 is pivotally supported on a pin 43 on the handle 26 and has finger rests 44 on opposite sides of the pivot adapted to be engaged by a pair of fingers of the operator for actuation in either direction to control the valve 39 and the reciprocation of the piston 30.

The barrel 28 is hollow, providing a longitudinally extending bore therethrough, in opposite ends of which are mounted bearing bushings 48 and 49. A driving sleeve 50, having a flange 51, is rotatably mounted in the bushing 48 and rotatably supports in the bore thereof an assembly of a pair of stripping and winding elements 52 and 53, a spindle 54 and a sleeve 55. The stripping and winding elements 52 and 53 are in the form of hollow, parti-cylindrical members supported by the sleeve 50 and supporting and substantially enclosing the forward end portion of the spindle 54. Outwardly directed flanges 56 are formed on the rear ends of the elements 52 and 53 and inwardly directed wall portions 57 are formed on the forward ends thereof. The winding and stripping element 52 is secured to the driving sleeve 50 by a pin 60 (Fig. 8) for rotation therewith and the element 53 is oscillatable relative to the element 52 and is urged for movement in one direction by a spring 58 (Figs. 1 and 5) mounted in recesses formed in the flanges 56 to yieldably urge the edges 59—59 of the elements 52 and 53 (Figs. 2 and 3) into engagement with each other.

The spindle 54 is in the form of a cylindrical rod or shaft having an enlarged forward portion or head rotatably supported within the stripping and winding elements 52 and 53 and having a reduced shank 61 forming a shoulder 62 at the juncture of the reduced and enlarged portions of the spindle. At its forward end, the spindle 54 is provided with an axially disposed cylindrical recess 63 for receiving the end of a terminal 23 during the winding of the wire 22 therearound.

The sleeve 55 is mounted on the shank 61 of the spindle for oscillatable movement and has one end thereof in abutting engagement with the shoulder 62. An axially directed groove 64 in the periphery of the head of the spindle 54 and a longitudinal slot 65 in the sleeve 55 (Figs. 8, 12, and 13) form a passageway for guiding the conductor 20 for movement through the tool when the sleeve 55 is in its normal position relative to the spindle. The groove 64 (Fig. 3) is disposed below the abutting edges 59—59 of the winding elements 52 and 53 when they are in their closed position.

The spindle 54 and the sleeve 55 extend through and are rotatably supported in the aperture of an annular driving disc or element 68, which is rotatably mounted in the bore of the barrel 28 in engagement with the end of the bushing 49 and has a cylindrical wall 69 extending therefrom and supported for rotation in the bushing 49. A locking pin 70 in the disc 68 (Fig. 1) extends into a recess in the spindle shank 61 for securing the disc 68 to the spindle 54 for rotation therewith and the pin 70 extends through an arcuate slot 71 in the sleeve 55 (Figs. 1 and 6) and serves to hold the sleeve 55 against axial displacement and in cooperation with the ends of the slot 71 to limit the extent of oscillation of the sleeve on the spindle shank to and from a normal position with the groove 64 and the slot 65 in alignment with each other. The spindle shank 61 extends axially beyond the end of the sleeve 55 and has a collar 72 pinned thereto which has an arcuate aperture 73 for the conductor 20 to pass through. A coiled spring 74, disposed between the end of the sleeve 55 and the collar 72 and and encircling the spindle shank and the conductor 20 has its opposite ends connected to the sleeve and collar, respectively, and serves to rotate the sleeve 55 to and yieldably maintain it in its normal position on the spindle shank 61 with the slots 64 and 65 therein in alignment as shown in Fig. 8.

The end walls 57 of the winding elements 52 and 53 have curved surfaces 79 (Figs. 2, 11, and 21) forming an eccentrically disposed substantially circular opening to provide clearance for the terminal 23 during the winding of the wire 22 thereon. Portions of the end walls 57 of the elements 52 and 53 are disposed in the path of movement of the conductor 20 and are provided with oblique or beveled surfaces 80 (Figs. 21 and 22) to form a pair of stripping and winding jaws 81 having relatively sharp cutting edges 82 formed by the oblique surfaces 80 and the end surfaces of the walls 57. Semi-circular recesses 83 in the edges of the jaws 81 cooperate to form a relatively small aperture to receive the wire 22 of the conductor therein when the sheath of insulation 21 is being skinned from the wire core 22.

The winding element 52 may be oscillated relative to the element 53 to separate the jaws 81 to permit the conductor 20 to be positioned therebetween, and the bevelled surfaces 80 of the jaws 81, which are tensioned for movement toward each other by the spring 58, serve to permit forward movement of the conductor 20 and maintain the jaws 81 open as the insulated conductor 20 advances. When the conductor 20 is stationary, the stripping jaws 81 tend to bite into the sheath 21 of insulation, and in response to a rearward movement of the conductor 20 or the wire core 22 relative to the jaws 81, the jaws cut into the sheath of insulation from opposite sides of the conductor to sever the sheath and then skin a portion thereof from the wire core 22. The wire core 22 is supported in the aperture formed by the recesses 83 of the jaws 81 as the sheath 21 is skinned therefrom. The jaws 81 are spaced axially from the end of the spindle a predetermined distance to provide space for the winding of the wire 22 around the terminal 13, and either the jaws 81 or the spindle 54 may be rotated separately while the other remains stationary to cause the wire 22 to be wound onto a terminal 23 disposed in winding position in the tool.

Selectively operable drive means are provided for rotating the spindle 54 in one direction while holding the jaws 81 stationary and for rotating the jaws 81 in the same direction while holding the spindle stationary. A bevelled gear 85 meshes with the gear 36 on the screw shaft 33 and is loosely mounted for rotation on the cylindrical outer surfaces of the stripping and winding elements 52 and 53 in abutting relation with the flange 51 of the driving bushing 50. The gear 85 has a recess 86 (Fig. 4) formed in the hub thereof which forms a single tooth ratchet wheel, and a driving pawl 87 which is pivotally mounted on the flange 51 of the driving bushing 50 is urged by a spring 88 into engagement with the ratchet wheel to establish a driving connection between the bevel gear 85 and the driving bushing 50 in response to the rotation of the bevel gear in a counterclockwise direction as viewed in Fig. 4.

A bevelled gear 89 is loosely mounted on the sleeve 55 for rotation thereon in meshing engagement with the bevelled gear 36 and in abutting relation to the drive disc 68. A recess 90 is provided in the hub of the bevelled gear 89 (Fig. 6) to form a one-tooth ratchet wheel, and a driving pawl 91 mounted on the driving element 68 is spring-urged into engagement with the ratchet wheel to effect a driving engagement between the bevelled gear 89 and the driving element 68 in response to the rotation of the bevelled gear 89 in a counterclockwise direction as viewed in Fig. 6. Spacing sleeves 93 and 94 interposed between the flanges 56 of the winding and stripping elements 52 and 53 and the gears 85 and 89 serve to retain the gears in engagement with the driving bushing 50 and the driving disc 68, respectively.

The single tooth ratchet wheels on the gears 85 and 89 and the pawls 87 and 91 cooperating therewith are arranged as indicated in Figs. 4 and 6, looking from the rear of the tool toward the front and in response to the upward movement of the piston 30, the worm shaft 33 and the bevelled gear 36 connected thereto impart rotation to the bevelled gear 85 in a counterclockwise direction and the gear 89 in the opposite direction and the pawl 87 effects a driving connection with the gear 85 and is rotated thereby to impart rotation to the drive bushing 50, the elements 52, 53, and the winding and stripping jaws 81 through a predetermined number of revolutions in a counterclockwise direction while simultaneously therewith the gear 89 is rotating in a clockwise direction without imparting rotation to the pawl 91 and the driving element 68. As the piston 30 travels downwardly from its upper position, rotation is imparted to the bevelled gear 85 in a clockwise direction without imparting rotation to the driving element 50, the elements 52, 53 and the jaws 81, and simultaneously therewith the bevelled gear 89 is rotated in a counterclockwise direction and the pawl 91 effects a driving connection therewith and is rotated thereby to impart rotation to the driving element 68 and the spindle 54 through a predetermined number of revolutions in a counterclockwise direction. Thus, in response to the upward movement of the piston 30, rotation is imparted to the winding jaws 81 in a counterclockwise direction while the spindle 54 is stationary, and in response to the downward movement of the piston 30, rotation is imparted to the spindle 54 in a counterclockwise direction while the winding jaws 81 remain stationary. At the beginning and end of each stroke of the piston 30 the spindle 54 and the jaws 81 are in the position shown in Fig. 1 with recesses 83 of the jaws 81 in alignment with the grooves 64 in the spindle.

When it is desired to wind the conductor 20 onto the first one of a group of terminals 23, the conductor 20 is positioned in the winding tool with the end portion thereof extending a predetermined distance beyond the forward end of the tool and the jaws 81 as shown in Fig. 14, the length of the projecting cord being sufficient to form substantially four convolutions around the terminal 23. With the conductor thus positioned the trigger 42 is actuated to move the valve and cause movement of the piston 30 upwardly to actuate the drive mechanism and effect the counterclockwise rotation of the jaws 81 through a predetermined number of revolutions while the spindle 54 is held stationary. As the jaws 81, which are spring pressed towards each other, start to rotate they sever the sheath of insulation 21 and hold one portion thereof against movement as the wire 22 is drawn through the recesses 83 and is wound around the terminal by the jaws 81. Upon completion of the winding operation, the end of the wire 22 will have been withdrawn from the stripped section 100 of the sheath of insulation 21, which will drop from the tool, and the wire 22 will be wound around the terminal 23 substantially as shown in Fig. 15 and as shown at 120 in Fig. 20. The tool may then be moved away from the first terminal 23 to the second terminal, the conductor 20 being pulled through the tool because of its connection to the first terminal and the sheath of insulation 21 will engage the bevel edges 80 of the jaws 81 and separate them as the conductor 20 passes therebetween in a forward direction.

The winding of the wire 22 about the second and succeeding terminals 23 of the group of terminals is accomplished by rotating the spindle 54 while holding the jaws 81 stationary, and in order to effect the winding of the conductor onto the terminals a predetermined length of the sheath of insulation 21 is skinned or longitudinally displaced from its normal position on the wire 22 prior to the winding of the wire on the terminal.

A conductor retracting device is provided for gripping the conductor 20 and moving it rearwardly to effect the skinning or displacing of a portion of the sheath of insulation 21 from the wire core 22. A pair of sleeves 104 and 105 are telescopingly mounted for reciprocation about the sleeve 55 and within the cylindrical member 69, which serves as a guide member for the retracting device. A coiled spring 107 interposed between a handle 108 on the sleeve 105 and the end of the sleeve 104 urges the sleeve 104 to the left, as viewed in Fig. 1, which movement is arrested by engagement of the forward end of the sleeve 104 with a split retaining ring 109 secured in a groove in the end portion of the sleeve 105. At its forward end, the sleeve 105 is provided with a longitudinally and radially extending slot 110 for receiving a gripping member 111 therein. The gripping member 111 which is flat and wedge-shaped, is confined for longitudinal movement with the sleeve 105 between the retaining ring 109 and the end of the slot 110 and has a serrated edge 112 engageable with the conductor 20 and an opposite obliquely disposed edge 113 engageable with the internal conical surface 114 formed in the forward end portion of the sleeve 104. The forward portion of the inner sleeve 105 is reduced in diameter to provide clearance for movement of the sleeve 104 rearwardly relative to the sleeve 105.

In response to the movement of the sleeve 104 to the right, as viewed in Figs. 8 and 9, the wedge member 111 is moved radially inwardly by the conical surface 114 into engagement with the conductor 20 to establish a gripping engagement between the serrations 112 on the gripping member and the sheath of insulation 21 on the conductor, and continued movement to the right of the sleeve 104 causes the conductor 20 to be moved rearwardly therewith from a position shown in Fig. 16 to that shown in Fig. 17 and causes the sheath of insulation to be skinned or longitudinally displaced from a portion of the core. An annular outwardly extending flange 117 on the rear end portion of the outer sleeve 104 forms a handle by means of which the conductor retracting device may be reciprocated. A pin 118 (Figs. 9 and 10), fixed in the sleeve 104, extends into a longitudinally disposed slot 119 in the sleeve 55 and cooperates therewith to impart oscillation to the sleeve 55 in response to turning movement of the sleeve 105 and also serves to limit the length of longitudinal reciprocation of the conductor retracting device by the engagement of the pin 118 with the ends of the slot 119.

After the end portion of the conductor 20 has been skinned and wound onto the first terminal 23 as indicated at 120 in Fig. 20, the tool is moved therefrom, as stated above, to permit the conductor 20 to be withdrawn through the jaws 81 a distance slightly greater than the distance between the first and second terminals plus a length substantially equal to the four convolutions to be wound around the second terminal at which point the handle 117 of the sleeve 105 is engaged by the operator and moved from the forward position shown in Fig. 8 to its retracted position shown in Fig. 1, thereby causing the conductor 20 to be retracted and causing the jaws 81 to sever the sheath of insulation 21 and hold it against axial movement (Fig. 16) while the wire 22 is being moved rearwardly to form a bare or skinned portion 120 of wire core (Fig. 17) which is subsequently wound around the second terminal as shown in Fig. 18 and at 130 in Fig. 5. With the portions of the conductor 20 supported in the winding tool in the position shown in Fig. 17 after the first terminal has been wound, the piston 30 is at the upper end of the cylinder and the tool may then be applied to the second terminal 23 and the valve trigger 42 actuated to cause the piston 30 to be moved downwardly and impart rotation to the spindle 54 in a counterclockwise direction through four revolutions as viewed from the rear of the winding tool (Fig. 6) while the jaws 81 remain stationary. The skinned portion 120 of the wire core will thus be wound by the spindle 54 around the second terminal 23 as shown in Fig. 18 and at 130 in Fig. 20. The winding tool may then be removed from the terminal 23 and the process repeated for the winding of other portions of the conductor onto other terminals. Preparatory to the winding of the wire 22 about the third and subsequent terminals 23 the valve trigger 44 has to be actuated to effect the movement of the piston to the top of the cylinder while the winding tool and the conductor are held away from the terminal 23. During the idle upward movement of the piston, the winding jaws 81 are rotated through four revolutions and carry the conductor 20 therewith, during which the sheath of insulation 21 is severed as the jaws are urged towards each other, and the wire core 22 is seated in the recesses 23 of the jaws.

Cut-off means are provided for severing the conductor 20 after a portion of the conductor has been skinned preparatory to winding the skinned portion 120 of the wire core about the last terminal. During the skinning of a portion of the wire preparatory to winding it on the terminal, the cord is retracted a predetermined distance which is sufficient to bring the end of the skinned portion of the core opposite the end of the head of the winding spindle 54 as shown in Fig. 17 at which point the wire core 22 may be severed. The cut-off mechanism for severing the wire comprises cutting edges 121 on the spindle 54 (Figs. 8 and 12) formed by the intersection of the annular shoulder 62 and the longitudinal groove 64 and a cutting edge 122 (Figs. 8 and 13) formed by the end surface of the sleeve 55 and the slot 65. The severing of the wire 22 is effected by relative turning movement of the spindle 54 and the sleeve 55, which is accomplished by engaging and turning the handle 108 to oscillate the sleeve 55 on the spindle 54. In response to the turning movement of the handle 108 in a counterclockwise direction as viewed from the rear or in Figs. 6 and 10, the handle 108, which is connected to the sleeve 55 through the pin and slot connection 118—119, will oscillate the sleeve to the extent permitted by the pin and slot connection 70—71 (Fig. 6) and will move the cutting edge 122 of the sleeve 55 into engagement with the cutting edge 121 of the spindle 54 to sever the wire 22 therebetween. During the turning movement of the sleeve to sever the wire, the spindle 54 is locked against rotary movement since it is connected by the pin 70 to the driving element 68, and the driving element 68 is held against rotation by the engagement of the pawl 91 thereon in the recess 90 in the gear 89 which is held against rotation when the piston 30 is not in motion. Upon release of the turning pressure, the spring 74 turns the sleeve to and yieldably retains it in its normal position on the spindle 54 with the groove 64 and the slot 65 in longitudinal alignment with each other.

After the wire 22 has been severed, the tool is applied to the last terminal of the row of terminals 23 and the valve trigger 42 actuated to cause the piston 30 to move downwardly and effect the rotation of the spindle 54 and the winding of the skinned portion of the wire core about the terminal as indicated in Figs. 19 and 20. The wire winding tool may then be removed from the terminal and the conductor 20 pushed forward a predetermined distance to the position shown in Fig. 14 preparatory to the next operation of attaching a conductor to a terminal.

If desired spring pressed detents and cooperating recesses may be provided for cooperation between the driving elements 50, 68 and the housing 28 to aid in holding either one of the driving elements 50, 68 against rotation while the other one is being rotated to wind portions of the conductor around a terminal.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for winding conductors around terminals, the combination of means for supporting a terminal in a predetermined winding position in coaxial alignment with a predetermined axis, a first conductor winding means and a second conductor winding means mounted in spaced relation to each other in an axial direction for rotation about said axis and for supporting a conductor for longitudinal movement in an axial direction and in eccentric relation to said axis and for revolving movement about a terminal in said winding position, drive means for selectively rotating said first and said second conductor winding means individually through a predetermined number of revolutions to wind portions of the conductor about the terminal, and means for supporting said aforementioned means in predetermined relation to each other.

2. In a device for winding insulated conductors onto terminals, the combination of means for supporting a terminal in a winding position in coaxial alignment with a predetermined axis, a first conductor winding means and a second conductor winding means mounted in spaced relation to each other in an axial direction for rotation about said axis and for supporting a conductor for longitudinal movement in an axial direction and in eccentric relation to said axis and for revolving movement about a terminal in said winding position, drive means for selectively rotating said first and said second conductor winding means individually through a predetermined number of revolutions to wind portions of the conductor about the terminal, means on one of said winding means for stripping the insulation from a portion of the conductor in response to rearward movement of the conductor relative to said one winding means, means for moving said conductor in a rearward direction to effect the stripping of the insulation from a portion of said conductor, and means for supporting said aforementioned means in predetermined relation to each other.

3. In a device for winding an insulated conductor onto terminals, the combination of means for supporting a terminal in a winding position in coaxial alignment with a predetermined axis, a first conductor winding means and a second conductor winding means mounted in spaced relation to each other in an axial direction for rotation about said axis and for supporting a conductor for forward movement in an axial direction and in eccentric relation to said axis and for revolving movement about a terminal in said winding position, drive means for selectively rotating said first and said second conductor winding means individually through a predetermined number of revolutions to wind portions of the conductor about the terminal, means on one of said winding means for stripping the insulation from a portion of the conductor in response to rearward movement of the conductor relative to said one winding means, means for moving said conductor in a rearward direction to effect the stripping of insulation from a portion of said conductor, means for severing a portion of the conductor, and means for supporting said aforementioned means in predetermined relation to each other.

4. A hand tool for stripping the insulation from the core of an insulated conductor and winding it onto terminals comprising a housing, a spindle mounted in said housing for rotation about its axis and having a central recess at one end thereof for supporting a terminal in a winding position in coaxial alignment therewith, a longitudinal groove in said spindle for supporting a conductor for rotation therewith in spaced relation to the axis thereof and for movement in an axial direction through said housing, a pair of jaws, means for eccentrically mounting said jaws in the path of movement of said conductor and in spaced relation to said spindle in an axial direction, means stressing said jaws for movement towards each other for yieldably engaging and supporting said conductor in spaced relation to said axis and a terminal disposed in said winding position, said jaws having means for severing and stripping the sheath of insulation from the core of the conductor in response to rearward movement of the conductor relative to said jaws and having means for supporting the core, means for moving said conductor rearwardly, and drive means for rotating said spindle through a predetermined number of revolutions to effect the winding of the stripped portion of the conductor around the terminal.

5. A hand tool for stripping the insulation from the core of an insulated conductor and winding it onto terminals comprising a housing, a spindle mounted in said housing for rotation about its axis and having means at one end thereof for supporting a terminal in coaxial alignment therewith, means on said spindle for supporting a conductor for rotation therewith in spaced relation to the axis thereof and for movement in an axial direction through said housing, means mounted in the path of movement of said conductor and in spaced relation to the end of said spindle in an axial direction and adjacent a terminal supported by said spindle for receiving said conductor as it is advanced and for severing and stripping the sheath of insulation from a portion of the core of the conductor in response to rearward movement of the conductor, means for moving said conductor rearwardly to effect the stripping of the insulation from a portion of the core of the conductor and the movement of the stripped core to a position where it may be wound onto said terminal, and drive means for rotating said spindle through a predetermined number of revolutions to wind the core onto the terminal.

6. A hand tool for stripping the insulation from the core of an insulated conductor and winding it onto terminals comprising a housing, a spindle mounted in said housing for rotation about its axis and having a central recess at one end thereof for supporting a terminal in coaxial alignment therewith and having an enlarged cylindrical portion on one end thereof provided with a longitudinal slot, a sleeve oscillatably mounted on said spindle and having a longitudinal slot therein normally aligned and cooperable with the slot in the enlarged portion of said spindle for guiding the conductor for movement through the housing and for rotation with the spindle, a first cutting edge formed by the slot on the end of said enlarged portion of said spindle, a second cutting edge formed by the slot on the end of said sleeve for cooperation with said first cutting edge to sever portions of said conductor in response to turning movement of the sleeve relative to the spindle from a normal position with said slots in alignment with each other, means for yieldably retaining said sleeve in said normal position on said spindle, means for turning said sleeve relative to said spindle, means mounted in the path of movement of said conductor and in spaced relation to the end of said spindle in an axial direction for receiving said conductor as it is advanced and for severing and stripping the sheath of insulation from a portion of the core of the conductor in response to rearward movement of the conductor relative to said stripping means, means for moving said conductor rearwardly through a predetermined distance to strip a portion of the insulation from the core, and drive means for rotating said spindle through a predetermined number of revolutions to wind the core around the terminal.

7. A device as defined in claim 6 in which said means for moving said conductor rearwardly is characterized by a conductor retracting member having a roughened surface engageable with the conductor, means for guiding said retracting member for axial reciprocable movement through a predetermined distance relative to said sleeve in alignment with the slot therein and for rotation therewith and for radial movement into and out of connecting engagement with a conductor disposed in said slot, and actuating means reciprocable relative to said spindle for reciprocating said retracting member and moving said member radially inwardly into connecting engagement with said conductor in response to rearward movement of the actuating member thereof to retract the conductor and effect the stripping of a portion of the insulation therefrom and for releasing said retracting member from connecting engagement with said conductor in response to forward movement of said actuating member.

8. A device for stripping the insulation from the core of a conductor and winding it onto terminals comprising a first conductor winding means, a second conductor winding means, means for supporting said first and said second conductor winding means for rotation about an axis and in spaced relation to each other in an axial direction, means for supporting a terminal in a predetermined winding position in coaxial alignment with said axis and with portions thereof disposed in an axial direction between said first and said second conductor winding means, said first and said second conductor winding means serving to support a conductor for forward axial movement in eccentric relation to said axis and adjacent a terminal in said winding position and for revolving movement of portions of said conductor about said axis and said terminal, said first conductor winding means having a pair of jaws urged towards each other for supporting a conductor and for severing the sheath of insulation and stripping it from a portion of the core of said conductor in response to rearward movement of said conductor, means for moving said conductor rearwardly, and drive means for selectively rotating said first and said second conductor winding elements individually through a predetermined number of revolutions to wind the conductor about the terminal.

9. A hand tool for stripping the insulation from the core of an insulated conductor and winding it onto terminals comprising a housing, a spindle mounted within said housing for rotation about its axis and having means at one end thereof for supporting a terminal in winding position in coaxial alignment therewith, means on said spindle for supporting a conductor in radially spaced relation to the axis thereof for rotation therewith and for movement in an axial direction through said housing, a pair of jaws mounted in said housing in axially spaced relation to one end of said spindle and in radially spaced relation to the axis thereof for rotation about said axis and for movement towards and away from each other, resilient means for urging said jaws into engagement with each other and a conductor disposed therebetween, said jaws and said spindle having normal predetermined positions with the jaws disposed in the path of movement of said conductor, said jaws having sloping surfaces engageable with the end of an axially advancing conductor for moving the jaws apart to receive the conductor therebetween and having means to sever the sheath of insulation and to strip it from the core of the conductor and to support the core in response to rearward movement of the conductor, means for selectively rotating said spindle and said pair of jaws through a predetermined number of revolutions to effect the winding of a portion of said conductor about the terminal, and means supported by said housing for moving said conductor rearwardly.

10. A hand tool for stripping the insulation from the core of an insulated conductor and winding it onto terminals comprising a housing, a spindle mounted within said housing for rotation about its axis and having means at one end thereof for supporting a terminal in winding position in coaxial alignment therewith, means on said spindle for supporting a conductor in radially spaced relation to the axis thereof for rotation therewith and for movement in a straight path in an axial direction through said housing, a pair of jaws mounted in said housing in axially spaced relation to one end of said spindle and in radially spaced relation to the axis thereof for rotation about said axis and for oscillating movement towards and away from each other, resilient means for urging said jaws into engagement with each other and a conductor disposed therebetween, said jaws and said spindle having normal predetermined positions with the jaws disposed in the path of movement of said conductor, said jaws having sloping surfaces engageable with the end of an axially advancing conductor for moving the jaws apart to receive the conductor therebetween and having means to sever the sheath of insulation and to strip it from the core of the conductor and to support the core in response to rearward movement of the conductor, means for selectively rotating said spindle and said pair of jaws through a predetermined number of revolutions to effect the winding of a portion of said conductor about the terminal, means supported by said housing for moving said conductor rearwardly, and means on said spindle for severing a portion of the conductor.

11. A hand tool for stripping the insulation from the core of an insulated conductor and winding it onto terminals comprising a housing, means supported by said housing for positioning a terminal in a winding position in coaxial alignment with a predetermined axis, means forming a passageway for guiding a conductor in a predetermined path in an axial direction through said housing and for supporting said conductor at the end of said passageway at a point adjacent a terminal in said winding position and in spaced relation to said axis, conductor winding means mounted for revolving movement about and in spaced relation to said axis and in spaced relation in an axial direction to said end of the passageway for supporting said conductor in spaced relation to said axis and for revolving movement about said terminal, said winding means having a normal position disposed in the path of said conductor to receive and guide it for forward movement and having means to sever and strip the sheath of insulation from a portion of the core thereof in response to rearward movement of the conductor core through said winding means as said conductor is wound onto said terminal, and drive means for rotating said conductor winding means through a predetermined number of revolutions for winding the core around the terminal.

12. A hand tool for stripping the insulation from the core of an insulated conductor and winding it onto terminals comprising a housing, means supported by said housing for positioning a terminal in a predetermined winding position in coaxial alignment with a predetermined axis, means forming a passageway for guiding a conductor in a predetermined path in an axial direction through said housing and for supporting said conductor at the end of said passageway at a point adjacent a terminal in said winding position and in spaced relation to said axis, conductor winding means including a pair of jaws urged for movement towards each other and mounted for rotation about said axis and in spaced relation in an axial direction to the end of the passageway for supporting said conductor in spaced relation to said axis and for revolving movement about said terminal, said pair of jaws having a normal position disposed in the path of said conductor and having means engageable with the end of an advancing conductor for moving the jaws apart to receive the conductor therebetween, means on said jaws to sever the sheath of insulation and strip it from a portion of the core of said conductor in response to rearward movement of the conductor core through said jaws as said conductor is wound onto said terminal, and drive means for rotating said conductor winding means through a predetermined number of revolutions to wind the bare core around the terminal, and means supported in said housing for severing the conductor.

13. A hand tool for stripping the insulation from the core of an insulated conductor and winding it onto terminals comprising a housing, a spindle mounted in said housing for rotation about its axis and having a central recess at one end thereof for supporting a terminal in coaxial alignment therewith and having an enlarged portion on one end thereof provided with a longitudinal slot, a sleeve oscillatably mounted on said spindle and having a longitudinal slot therein normally aligned with and cooperable with the slot in the enlarged portion of said spindle for guiding the conductor for movement through the housing and for rotation with the spindle, a first cutting edge formed by the slot on the end of said enlarged portion of said spindle, a second cutting edge formed by the slot on the end of said sleeve for cooperation with said first cutting edge to sever portions of said conductor in response to turning movement of the sleeve relative to the spindle from a normal position with said slots in alignment with each other, means for yieldably retaining said sleeve in said normal position on said spindle, means for turning said sleeve relative to said spindle, a pair of winding and stripping jaws, means stressing said jaws for movement towards each other to a closed position, means mounting said jaws in the path of movement of said conductor and in spaced relation to the end of said spindle in an axial direction for receiving said conductor as it is advanced, means on said jaws for severing and stripping the sheath of insulation from a portion of the core of the conductor in response to rearward movement of the conductor relative to said jaws, a conductor retracting member having a roughened surface engageable with the conductor, guide means mounting said retracting member for axial reciprocable movement through a predetermined distance relative to said sleeve and in alignment with the slot therein and for rotation therewith and for radial movement into and out of connecting engagement with a conductor disposed in said slot, actuating means reciprocable relative to said spindle for reciprocating said retracting member and moving said member radially inwardly into connecting engagement with said conductor in response to rearward movement of the actuating member thereof to retract the conductor and effect the stripping of a portion of the insulation therefrom and for releasing said retracting member from connecting engagement with said conductor in response to forward movement of said actuating member, and drive means for selectively rotating said pair of winding jaws and said spindle individually through a predetermined number of revolutions to wind the conductor about the terminal.

14. In a hand tool for winding a conductor onto terminals, the combination of a housing, a spindle rotatably supported in said housing and having an axially disposed recess at one end thereof for positioning a terminal therein and having an eccentric longitudinally disposed slot for supporting a conductor for longitudinal movement and for revolving it around a terminal positioned in said recess, a member mounted for rotation about said spindle and having conductor supporting means disposed in a predetermined spaced relation to said one end of the spindle in an axial direction and in alignment with the slot in the spindle and in radially spaced relation to the axis thereof and to a terminal in said recess for supporting a conductor for longitudinal movement and for revolving it around a terminal positioned in said recess, and drive means in said housing including an element reciprocable through a predetermined stroke for rotating said member and said conductor winding means through a predetermined number of revolutions to wind a portion of the conductor about a terminal in response to movement of said element in one direction and for rotating the spindle through said predetermined number of revolutions to wind a portion of the conductor about a terminal in repsonse to movement of said element in the reverse direction.

15. A hand tool for winding conductors onto terminals comprising a housing, a spindle mounted in said housing for rotation about its axis and having a central recess at one end thereof for supporting a terminal in winding position in coaxial alignment therewith and having an enlarged portion on one end thereof provided with a longitudinal slot, a sleeve oscillatably mounted on said spindle and having a longitudinal slot therein normally aligned and cooperable with the slot in the enlarged portion of said spindle to form a passageway for guiding the conductor for movement through the housing and for rotation with the spindle about a terminal disposed in winding position, means for yieldably retaining said sleeve in a normal position on said spindle with said slots in alignment, a first cutting edge formed on the end of said enlarged portion of said spindle, a second cutting edge formed on the end of said sleeve for cooperation with said first cutting edge to sever a portion of said conductor in response to turning movement of the sleeve relative to the spindle from a normal position with said slots in alignment with each other, means for turning said sleeve relative to said spindle, means mounted in spaced relation to the end of said spindle in an axial direction and in alignment with the slot in the spindle for receiving and yieldably holding said conductor in spaced relation to the axis of said spindle and a terminal in winding position, and drive means for rotating said spindle through a predetermined number of revolutions to wind the conductor around the terminal.

16. In a hand tool for stripping the insulation from an insulated conductor and winding it onto terminals, the combination of a housing, a spindle rotatably supported in said housing and having an axially disposed recess at one end thereof for positioning a terminal therein and having an eccentric longitudinally disposed slot for supporting a conductor for longitudinal movement and for revolving it around a terminal positioned in said recess, a pair of members mounted for rotation about the axis of said spindle and having jaws disposed in a predetermined spaced relation to said one end of the spindle in an axial direction and in alignment with the slot in the spindle and in radially spaced relation to the axis thereof and a terminal in said recess, means for urging the jaws into engagement with each other, said jaws having sloping surfaces engageable with an advancing conductor for moving the jaws apart to receive the conductor therebetween and having sharp cutting edges for severing the sheath of insulation around the core of the conductor and being shaped to provide an aperture for supporting the core, said jaws serving to strip the sheath of insulation from the core of the conductor in response to rearward movement of the conductor, means for moving said conductor rearwardly to effect the stripping of a portion of said insulation from the core of said conductor, and drive means in said housing including an element reciprocable through a predetermined stroke for rotating said jaws through a predetermined number of revolutions to wind a portion of the conductor about a terminal in winding position in response to movement of said element in one direction and for rotating the spindle through said predetermined number of revolutions to wind a portion of the conductor about a terminal in winding position in response to movement of said element in the reverse direction.

17. In a hand tool for winding a conductor onto terminals, the combination of a housing, a spindle rotatably supported in said housing and having an axially disposed recess at one end thereof for positioning a terminal therein and having an eccentric longitudinally disposed slot for supporting a conductor for longitudinal movement therein and for revolving it around a terminal positioned in said recess, a pair of members mounted for rotation about the axis of said spindle and having jaws disposed in a predetermined spaced relation to said one end of the spindle in an axial direction and in alignment with the slot in the spindle and in radially spaced relation to the axis thereof and to a terminal in said recess, resilient means for urging the jaws into engagement with each other, said jaws having sloping surfaces engageable with an advancing conductor for moving the jaws apart to receive the conductor therebetween and being shaped to support the conductor, a pair of gears mounted for rotation on said spindle, means for establishing a driving connection between one of said gears and said members and between the other one of said gears and said spindle in response to rotation of said gears in one direction, a drive gear for simultaneously rotating said gears in opposite directions, and means including an element reciprocable through a predetermined stroke for rotating said drive gear in one direction to rotate said jaws through a predetermined number of revolutions to wind a portion of the conductor onto a terminal in response to movement of said element in one direction and for rotating the drive gear in the opposite direction for rotating the spindle through said predetermined number of revolutions to wind a portion of the conductor about the terminal in response to movement of said element in the reverse direction.

18. A hand tool for stripping insulation from the core of an insulated conductor and winding it onto terminals comprising a housing, a spindle mounted in said housing for rotation about its axis and having a central recess at one end thereof for supporting a terminal in winding position in coaxial alignment therewith and having an enlarged portion on one end thereof provided with an eccentrically disposed longitudinal slot for supporting a conductor for longitudinal movement and for revolving it about a terminal in winding position, a sleeve oscillatably mounted on said spindle and having a longitudinal slot therein normally aligned and cooperable with the slot in said spindle for guiding the conductor for movement through the housing and for rotation with the spindle, means for yieldably retaining said sleeve in a normal position on said spindle with said slots in alignment, a first cutting edge formed on the end of said enlarged portion of said spindle, a second cutting edge formed on the end of said sleeve for cooperation with said first cutting edge to sever a portion of said conductor in response to turning movement of the sleeve relative to the spindle from said normal position, means for turning said sleeve relative to said spindle to sever said conductor, a pair of members mounted for rotation on said spindle and having a pair of jaws disposed in predetermined spaced relation to said one end of the spindle in an axial direction and in alignment with the slot in the spindle and in radially spaced relation to the axis thereof and to a terminal in winding position, means for urging the jaws into engagement with each other, said jaws having sloping surfaces engageable with an advancing conductor for moving the jaws apart to receive the conductor therebetween and having sharp cutting edges for severing the sheath of insulation around the core of the conductor and being shaped to provide an aperture for supporting the core of the conductor, said jaws serving to strip the sheath of insulation from the core of the conductor in response to rearward movement of the conductor through the jaws, and drive means including an element reciprocable through a predetermined stroke for rotating said jaws through a predetermined number of revolutions to wind a portion of the conductor about a terminal in response to movement of said element in one direction and for rotating the spindle through said predetermined number of revolutions to wind a portion of the conductor about a terminal in winding position in response to movement of said element in the reverse direction.

19. In a hand tool for stripping the insulation from the core of a conductor and winding it onto terminals, the combination of a housing, a spindle rotatably supported in said housing and having means at one end thereof for coaxially positioning a terminal in winding position and having an eccentric longitudinally disposed slot for supporting a conductor for longitudinal movement and for winding it around a terminal disposed in winding position by said spindle, a pair of jaws, means eccentrically mounting said jaws in longitudinally spaced relation to said end of the spindle and in alignment with the slot therein and for revolving movement around the axis of the spindle and a terminal disposed in winding position, said jaws having sloping surfaces engageable with an advancing conductor for moving the jaws apart to receive the conductor therebetween and having cutting edges for severing the insulation thereon and being shaped to provide an aperture for supporting the core of the conductor, resilient means for urging the jaws into engagement with each other whereby said jaws serve to sever and strip the insulation from the core in response to a rearward movement of the core through the jaws, means for moving said conductor rearwardly to effect the stripping of a portion of the insulation from the core of the conductor, means for severing a portion of said conductor, a pair of gears mounted for rotation on said spindle, means for establishing a driving connection between one of said gears and said jaws and between the other one of said gears and said spindle in response to rotation of said gears in one direction, a drive gear for simultaneously rotating said gears in opposite directions, and means including an element reciprocable through a predetermined stroke for rotating said drive gear in one direction to rotate said jaws through a predetermined number of revolutions to wind a portion of the conductor onto a terminal in response to movement of said element in one direction and for rotating the drive gear in the opposite direction for rotating the spindle through said predetermined number of revolutions to wind a portion of the conductor about the terminal in response to movement of said element in the reverse direction.

No references cited.